Dec. 11, 1923.

M. J. SMITH

BELT

Filed March 22, 1918

1,477,084

WITNESS:
Rob't R Kitchel.

INVENTOR
Manning J. Smith
BY Frank S. Busser
ATTORNEY.

Patented Dec. 11, 1923.

1,477,084

UNITED STATES PATENT OFFICE.

MANNING J. SMITH, OF PHILADELPHIA, PENNSYLVANIA.

BELT.

Application filed March 22, 1918. Serial No. 223,988.

*To all whom it may concern:*

Be it known that I, MANNING J. SMITH, a citizen of the United States, residing at Philadelphia, county of Philadelphia, and State of Pennslyvania, have invented a new and useful Improvement in Belts, of which the following is a full, clear, and exact description, reference being had to the accompanying drawings, which form a part of this specification.

My invention relates to that kind of endless power transmission belt which is formed of flat webbing wound upon itself to form a belt having a plurality of thicknesses. The object of the invention is to secure the two free ends of the belt to intermediate parts of the webbing in such manner that the belt will present its maximum strength and durability at the points of union instead of being weaker and less durable at these points than elsewhere. Another object of the invention is to minimize fraying out of the belt along the edges thereof at the point or points of union and also to prevent any fraying out that may occur on either face of the belt from weakening the belt in the slightest degree. To this end, the flat webbing is made of such length relative to the circumference of the endless belt to be formed that at every point in such circumference the belt (in the case of a two-ply webbing) comprises two thicknesses of solid webbing, while each extreme end of the webbing, from which the filling or transverse threads have been removed, necessarily overlies two solid thicknesses of webbing. The loose-warp ends are therefore so arranged that they do not overlap each other, but overlap only the solid part of the belt. To avoid an extra thickness of solid webbing at the points of union of the free ends, the transverse lines along which the loose-warp ends project from the ends of the solid webbing are arranged substantially opposite one another, or in substantial alinement. Consequently, at the locus of union, the belt comprises, for a short distance, two solid thicknesses of webbing and two sets of non-overlapping loose warp ends, each set overlying only solid thicknesses of webbing and adjacent sets overlying contiguous lengths of solid webbing. The invention also comprises certain details of construction and manipulation, which are hereinafter set forth.

A preferred embodiment of the invention is shown in the accompanying drawings, in which—

Figure 1:
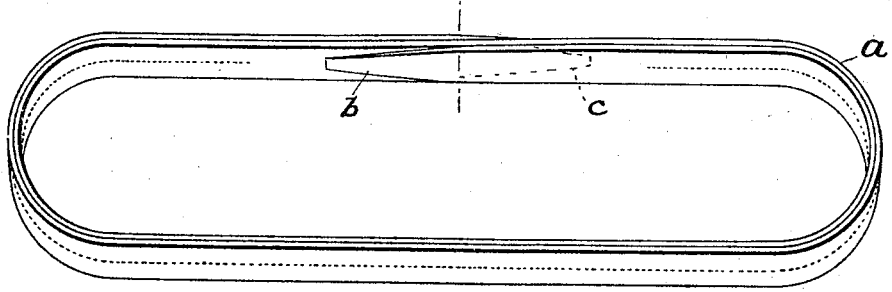
Figure 2:
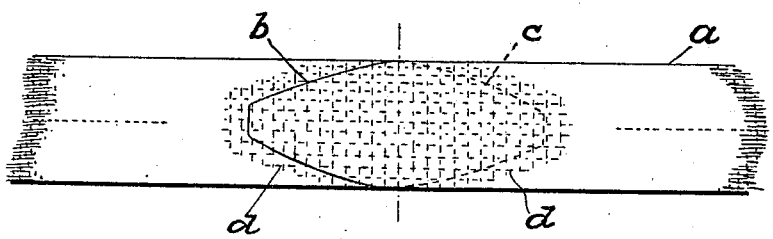
Figure 3:
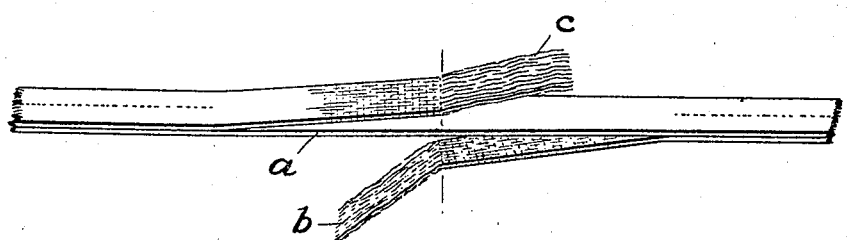
Figure 4:
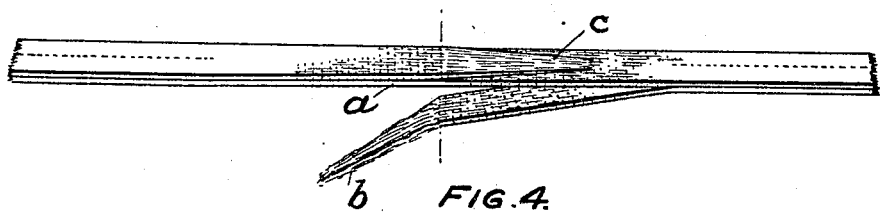

Fig. 1 is a perspective view, somewhat diagrammatic, of the finished belt. Fig. 2 is a plan view of the joint between the ends of the webbing and the intermediate part thereof. Figs. 3 and 4 are perspective views showing different stages in the operation of forming the joint.

The webbing *a*, which is preferably of woven fabric, is cut to a length equal to twice the intended circumference of the belt plus a length at each end which is to be frayed out and secured to an intermediate portion of the belt. The fraying out of the ends is preferably accomplished by removing the weft or filling, leaving merely loose ends of warp. I prefer to cut off a certain proportion of these loose ends. It is desirable to cut these off at a point between the solid webbing and the free extremities of the threads. Less preferably the ends of the belt may be reduced in thickness and prepared for attachment to the solid part of the belt by scarfing. These different expedients are known in the art and I mean to include them all by the expression "frayed-out warp ends", which are marked *b* and *c*.

The belt is then wound upon itself spirally until the ends of the solid part of the webbing are brought into alinement, or opposite each other, as shown in Fig. 3. The fringed out ends *b* are then secured to the single thickness of solid webbing overlapped thereby. Before securing the warp ends *b*, the front extremities are gathered together so that the group of loose ends tapers toward its extremity, as shown in Fig. 4 and also in Fig. 2. The warp ends *b* are then secured to the webbing by longitudinal and transverse stitches, as shown at *d*, Fig. 2. The warp ends *c* are similarly manipulated and are secured to both plies of solid webbing by similar stitching.

In the ordinary two-ply woven belt, the effort seems to be to secure a strong union between the ends of the webbing and the intermediate part of the webbing and at the same time preserve a uniform thickness of belt throughout its circumference. The latter result is secured only approximately, and after some period of use the wearing away of the frayed-out warp ends reduces the thickness of the belt at the locus of union, while at the same time the strength of the belt at this point progressively diminishes. Virtually, the actual pulling strength of the belt scarcely exceeds the strength of the single ply of solid webbing which is present at this point. The strength and appearance of the belt is further impaired by the wearing away of those frayed out warp ends adjacent the edge of the belt.

In my improved belt, I have discarded the theory of the necessity of preserving a uniform thickness of belt throughout the circumference of the belt and have deliberately thickened the belt at the locus of union, but only to a minor degree; the frayed out warp threads lending themselves to such compression, in the absence of the filling, as to render the increased thickness scarcely noticeable. Instead, however, of weakening the belt at this point, it is actually stronger than at any other point, as careful tests demonstrate; the reason therefor doubtless being that at the point of union, the double thickness of belt is preserved, while at the same time the belt is reinforced. In actual use, this part of the belt is the last to exhibit signs of serious wear, and the belt, therefore, is as durable as if it were composed of two concentric endless belts of solid webbing.

By tapering, more or less, each group of warp ends toward its extremity, or otherwise inwardly offsetting those warp ends nearer the longitudinal edges of the webbing, I avoid the presence, in the finished fabric, of any such warp ends adjacent to the edge of the belt. Consequently one of the serious objections to the ordinary two ply woven belt—the disintegration of the secured frayed out warp ends along the edge of the belt—is rendered impossible.

The two plies of solid webbing may be secured together in any usual way, as by longitudinal stitching.

Having now fully described my invention, what I claim and desire to protect by Letters Patent is—

A continuous belt built up of a strip of fabric having longitudinally extending warp threads and transversely extending weft threads, said belt being built up of at least two convolutes, the weft being removed from the extremities of the strip to provide frayed warp extending from the woven body, the ends of the woven body lying substantially opposite each other on opposite sides of an intermediate convolute while the frayed warp ends extend in opposite directions from the joint and are stitched to at least two thicknesses of the strip, the frayed warp ends near the longitudinal edges of the webbing being offset.

In testimony of which invention, I have hereunto set my hand, at Philadelphia, on this 19th day of March, 1918.

MANNING J. SMITH.